United States Patent Office 3,530,283
Patented Sept. 22, 1970

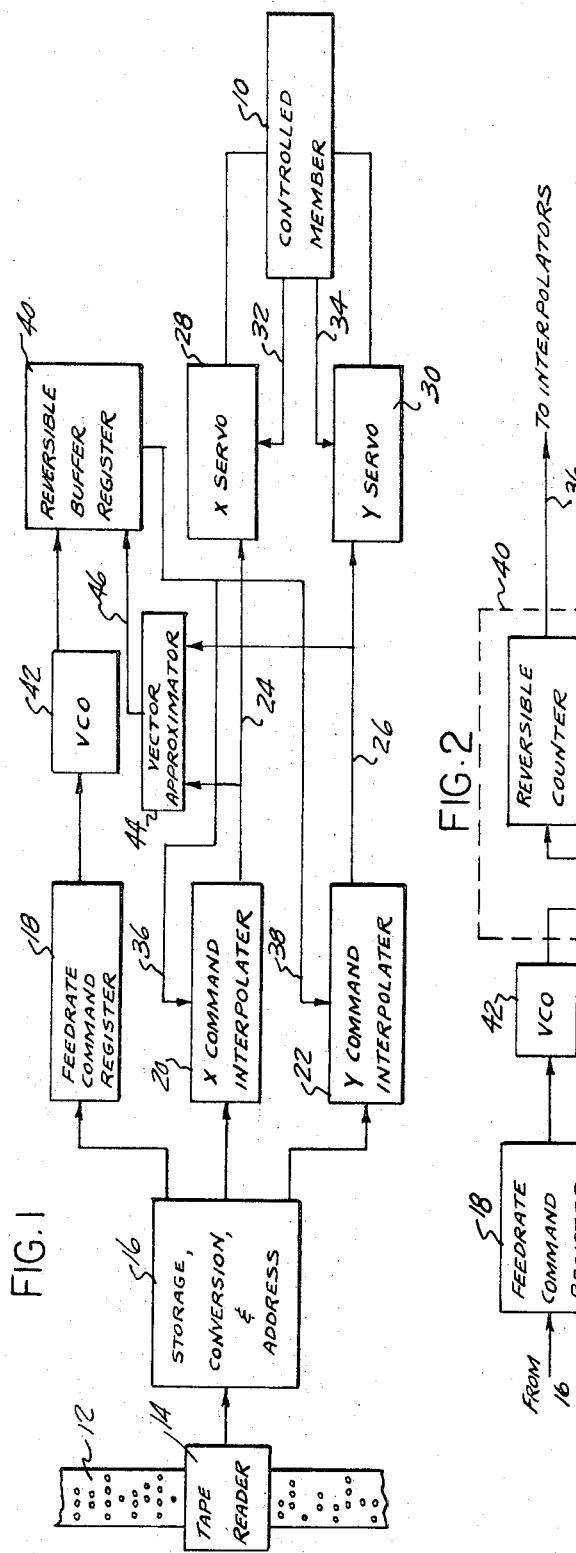
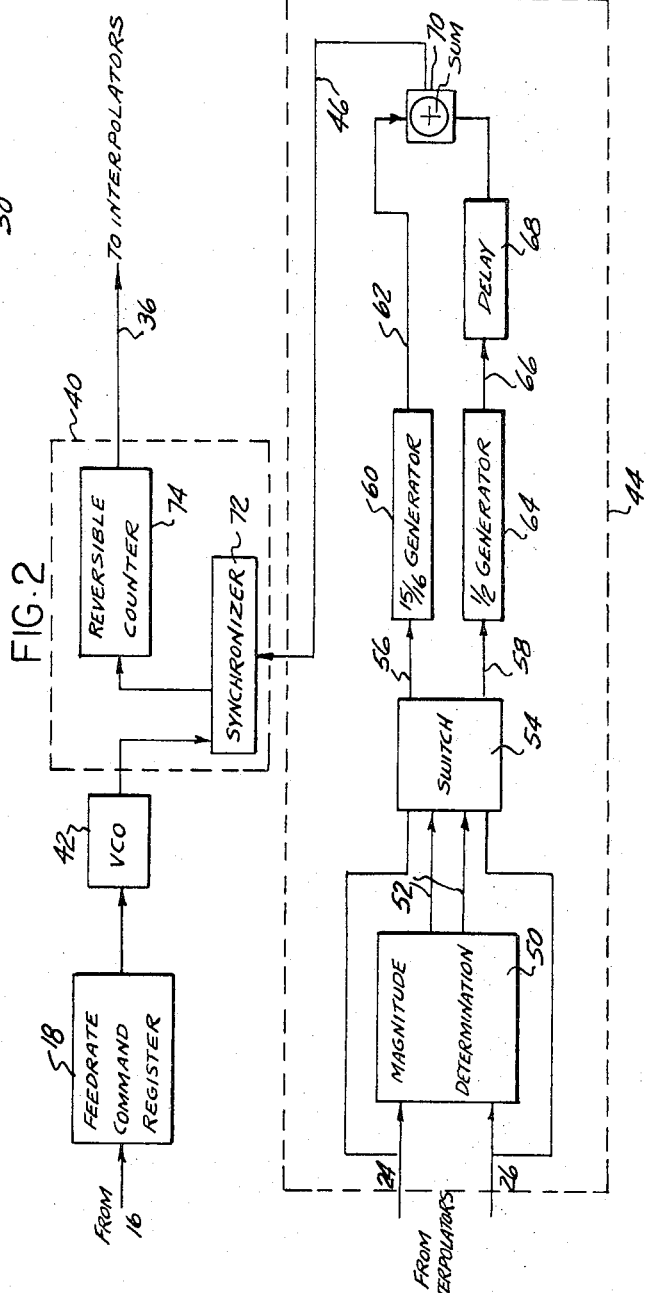

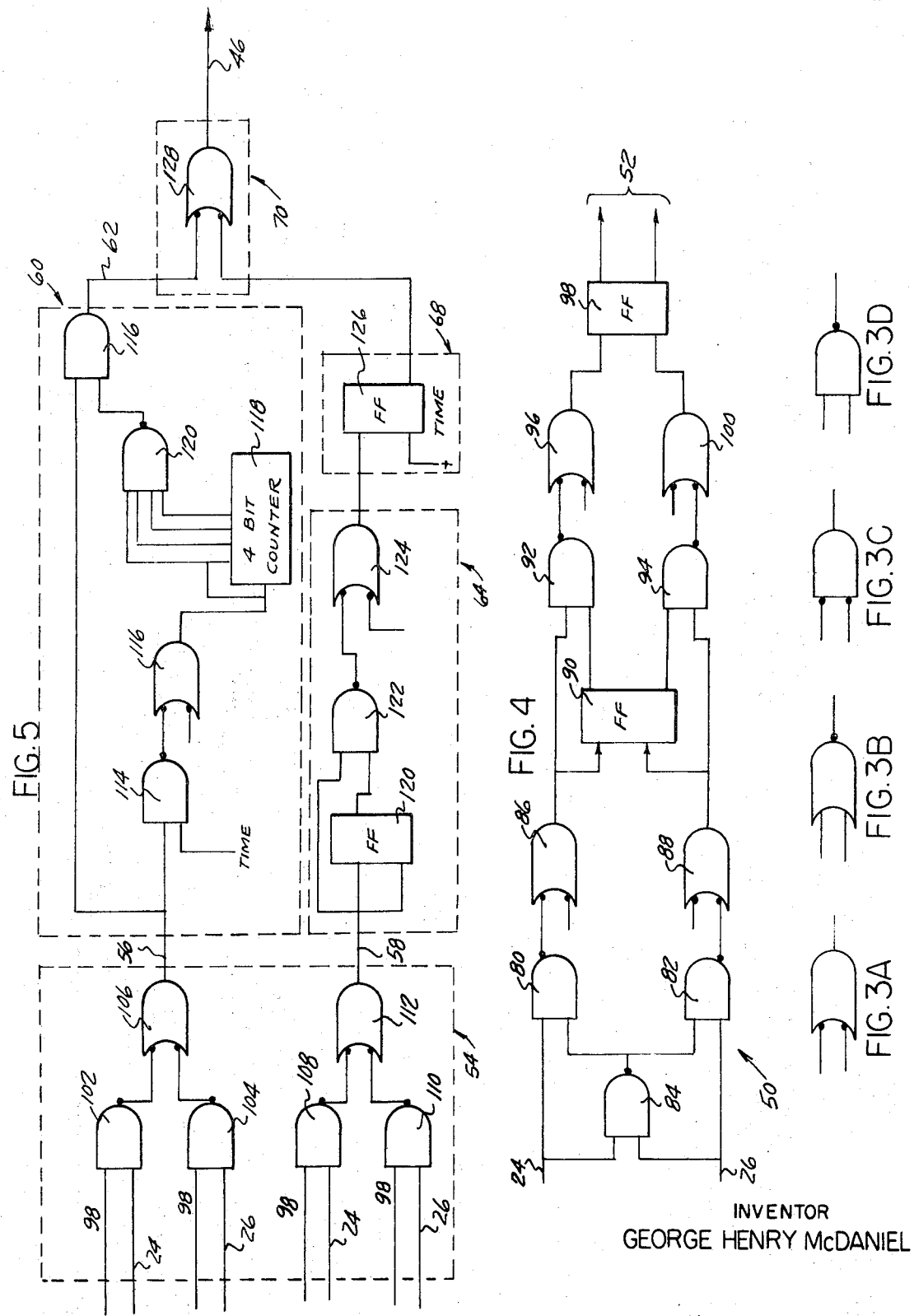

3,530,283
FEED RATE CONTROL FOR CONTOURING OR SLOPE CONTROL SYSTEM
George H. McDaniel III, Northville, Mich., assignor to The Bendix Corporation, a corporation of Delaware
Filed Sept. 11, 1967, Ser. No. 666,902
Int. Cl. G06f 7/64
U.S. Cl. 235—150.5       13 Claims

ABSTRACT OF THE DISCLOSURE

The input data to a numerical control system consists of commands directing the distances over which a part is to be moved along each of a plurality of mutually perpendicular axes and a feed rate command number proportional to the rate at which the resultant of these motions is to occur. Each command number is repeatedly added into a register and overflows from the registers generate a plurality of command pulse trains for the various axes wherein each pulse represents a basic increment of movement of the output member along its axis. These pulse trains are provided to servo systems for each axis and to a vector approximator which generates a pulse train having frequency proportional to the rate of motion of the resultant of the component motions commanded by the various pulse trains. The feed rate command is used to generate a pulse train having a frequency proportional to the rate at which the motion is commanded to occur. The output of the vector approximator and the feed rate pulse train are respectively used to add or subtract from the count in a reversible buffer register. When the count is of one polarity, indicating that more pulses have been received from the vector approximator than from the command pulse train, the command adder operation is terminated when the count on the buffer is of an opposite polarity indicating that more pulses have been received from the feed rate command train than from the vector approximator, the addition process is renewed.

BACKGROUND OF THE INVENTION

Field of the invention

This invention relates to electronic systems for controlling the movement of an output member through a path in at least two dimensions in accordance with numerical information; more particularly to such systems wherein the numerical information consists of a plurality of commands indicating the commanded motions of the output member along mutually perpendicular axes and these commands are used to generate pulse trains for each axis, each pulse representing a basic increment of motion; and still more particularly to such systems wherein the numerical data commands a rate at which the resultant motion of the output member should occur.

Description of the prior art

In contouring or slope control systems wherein numerical commands representing coordinates of motions along mutually perpendicular axes are provided to interpolators of the binary related pulse train type or the digital differential analyzer type which have a pulse train or add command as their other input, the control tape at one time carried a feed rate command for each block which was used to control the rate of production of the pulses provided to the command multipliers. This command number was separately calculated by a programmer for each motion controlling block. The calculation of this feed rate command involved the determination of resultant motion of the output device as commanded by the incremental motions along various coordinates. In order to ease the burden on the programmer and achieve various other benefits, later systems simply programmed the tape with a feed rate number which directly represented the desired rate of motion of the output member. This number might be used with a relatively large number of blocks. The control itself then calculated the resultant length of motion of the output member, either as encoded in the numerical data, or as derived from the pulse trains provided to the servos, and used this data, along with the feed rate number, to control the rate of operation of a voltage controlled oscillator providing the pulse trains for the operational multipliers. Calculation of the resultant path length involved the *derivation* by analog means of the expression $\sqrt{x^2+y^2}$ and the use of this signal, along with the feed rate command signal, to control a voltage controlled oscillator which provided the pulse stream to the operational multipliers or the add signal to the digital differential analyzer units.

SUMMARY OF THE PRESENT INVENTION

The present invention utilizes fully digital circuitry of a relatively simple configuration to cause the resultant motion energized by the plurality of command pulse trains to occur at a rate dictated by a feed rate command number coded on the tape. It broadly achieves this by using a voltage controlled oscillator fed with the feed rate command to derive a train of "feed pulses" having a frequency proportional to the commanded feed rate. These feed pulses are fed into a multiple stage reversible binary buffer counter in a first direction. A second input to the counter, which causes it to count in the reverse direction, comes from a vector approximator circuit. This approximator has the plurality of command pulse trains as its input and operates in a fully digital manner to derive an output pulse train which has a frequency closely approximating the resultant rate of motion of the output member while under simultaneous control of the plurality of command pulse trains. The output of the last stage of the reversible counter is used to control the operation of the interpolators which receive the command numbers and provide the command pulse trains as their outputs. When the state of the last stage is in a first condition, indicating that fewer pulses have been received than from the vector approximator than feed pulses, the operation of the interpolators is initiated. Their operation is terminated at such time as the state of the last counter stage reverses indicating that a number of vector approximator pulses equals the number of command pulses received.

The vector approximator generates an output pulse train having a frequency proportional to the resultant motion rate by multiplying each of the input command pulse trains by fractional constants and adding their sums. The fractional constants chosen are dependent upon the degree of accuracy required by the system. For example, in the preferred embodiment of the invention, associated with a two axis control, the rate of the resultant motion is approximated by the equation $$\tfrac{15}{16}A + \tfrac{1}{2}B = \sqrt{A^2 + B^2}$$

where A equals the command pulses of the larger component, B equals the command pulses of the smaller component. The approximation $$A + \tfrac{1}{2}B + \tfrac{1}{4}C = \sqrt{A^2 + B^2 + C^2}$$

might be employed in a three axis control where A is the largest component and C is the smallest component. This approximation is accurate within plus or minus 13.5% of the actual value.

In the two axis case represented by the preferred embodiment, the vector approximator determines which of the two command pulse rates is the highest by a two flip-flop circuit wherein the pulses of one train set the first flip-flop and the pulses of the second train reset it. The second flip-flop is set at such time as the first flip-flop is set and another pulse of the first train is received and is reset at such time as the first flip-flop is reset and the pulse of the second train is received. The fact that two pulses of one train may occur before the intervention of one pulse in the other train indicates that the frequency of the first considered train is the larger. The stream thus determined to be the larger is passed through a four bit binary counter which allows fifteen of each sixteen pulses to be provided to the output and inhibits the sixteenth. The command pulse train determined to be the smaller is similarly passed through a one stage counter which provides every other pulse to a point where it is summed with the first train. This sum constitutes the vector approximator pulses which are provided to the reversible binary counter.

In the preferred embodiment of the invention the operational multipliers are of the digital differential analyzer type. Each time a pulse is received in the input pulse train a command number is added into an initially empty register. Overflows from the registers constitute the command pulses. The input pulse train is derived under the control of the last stage of the reversible binary buffer counter as has been noted.

It is therefore seen to be a primary object of the present invention to provide a feed rate arrangement for a contouring or slope control system of the command pulse type wherein a buffer counter is employed to control the frequencies of the command pulse trains by receiving a pulse train proportional to the commanded pulse rate and a second pulse train proportional to the rate of the resultant motion being instantaneously commanded, and providing conditioning signals to the controllers which derive the command pulse trains at such time as a number of pulses in the command pulse stream exceeds those in the vector pulse stream.

Another object is to provide such a system where in the resultant motion rate is approximated by multiplying each of the command pulse trains by an appropriate factional quantity and summing them.

Other objects, advantages and applications of the present invention will be made apparent by the following detailed description of a preferred embodiment of the invention. The description makes reference to the accompanying drawings in which:

FIG. 1 is a block diagram of a two axis numerically controlled contouring system embodying the feed rate control of the present invention and constituting a preferred embodiment thereof;

FIG. 2 is a more detailed block diagram of the feed rate control itself;

FIGS. 3A-3D illustrate the symbols employed for NAND gates in the following schematic diagrams;

FIG. 4 is a schematic diagram of the circuitry which determines the larger of the two command numbers; and FIG. 5 is a schematic diagram of the vector approximator which operates under the control of the circuitry of FIG. 4.

Referring to the drawings, the preferred embodiment of the invention is disclosed in connection with a system for controlling the motion of a member 10 in accordance with numerical data contained on a record medium such as punched tape 12. The control exercised over the member 10 may be either of the contouring variety wherein a conplex path is to be followed at controlled rates or the simpler slope or arc controlled variety. The system which constitutes the preferred embodiment of the invention constitutes a two axis contouring control, but the inventive concepts are equally applicable to other systems.

The information encoded in the tape is conventionally arranged in blocks each representing a single motion path. The information is converted into the form of electrical signals by a tape reader 14 and transmitted to a sub-system 16 termed the storage, conversion and address block. This unit receives the electrical signals from the tape reader 14, makes any necessary conversion of them, such as converting binary coded decimal signals of the type commonly used on tape into straight binary signals, and directs the various converted signals to appropriate sections of the subsequent control at appropriate times.

A single block may include an X command number representing the distance the part is to be moved along one axis, and a Y command number signalling the distance the part is to be simultaneously moved along a second axis which is perpendicular to the first. Additionally, the tape will contain a feed rate command indicating the rate at which the resultant motion of the output member is to occur. A feed rate command may not necessarily be associated with each block but a single command may be utilized for a plurality of blocks.

At an appropriate point in the operational cycle of the system the storage, conversion and address unit 16 provides a feed rate command to a storage unit 18 and simultaneously provides an X axis command number to an X command interpolator 20 and a Y axis command number to a Y command interpolator 22. The purposes of the X and Y command interpolators 20 and 22 are to provide output trains on lines 24 and 26 respectively commanding motions which will achieve the encoded directions. The output 24 of the X command interpolator 20 is provided to an X axis servo 28 and the Y axis pulse train on line 26 is similarly provided to a Y axis servo 30. The servos 28 and 30 are responsive to their input pulse trains to move the controlled member 10 through one increment of motion along their respective axes for each pulse in their input trains. The rate of motion is proportional to the instantaneous frequencies of the respective trains and the resultant motion of the controlled member is along lines in the X Y plane which are functions of the components of motion as controlled by the X and Y servos. These motions may be straight lines, circular arcs or parabolic paths depending upon the mode of operation of the X and Y command interpolators 20 and 22. Appropriate transducers attached to the controlled members provide feedback signals to the X and Y servos on lines 32 and 34.

The X and Y command interpolators 20 and 22 additionally receive inputs on lines 36 and 38 respectively from a reversible buffer register 40. The signals on lines 36 and 38 condition the operation of the command interpolators 20 and 22. In the preferred embodiment of the invention the X and Y command interpolators constitute repeated adders of the digital differential analyzer type as disclosed in U.S. Pats. No. 2,841,328 or 3,128,374. Accordingly, the command numbers are repeatedly recirculated in these interpolators and added into initially empty registers (not shown) at such time as a signal is present on the conditioning inputs 36 and 38. The overflows of these initially empty registers are provided on lines 24 and 26 and occur at rates proportional to the length of the command numbers. By this technique the pulse trains provided to the servos cause the servos to move through distances dictated by the command numbers at rates proportional to the command numbers.

The reversible buffer register has one input from a voltage controlled oscillator 42 that is connected to the feed rate command storage unit 18 and provides an output pulse train at a frequency proportional to the feed rate command number. The reversible buffer register 40 is provided by a vector approximator unit 44 which has the two pulse trains on lines 24 and 26. The function of the vector approximator 44 is to derive an output pulse train, for provision to the buffer register 40 on line 46, which has a frequency proportional to the rate at which the controlled member 10 would be moved by the two component motions energized by the X servo 28 and the Y servo 30.

The pulses from the oscillator 42 count the buffer register in one direction and the pulses from the vector approximator count the buffer register in the opposite direction. When the output stage of the buffer register 40 is in one state the number of pulses provided by the oscillator 42 will have exceeded the number provided by the approximator 44. This indicates that the output motion rate is less than the commanded rate. At such time signals are sent on lines 36 and 38 to the interpolators initiating their operation. The system dynamics are such that the outputs from the interpolators, while they are running, will exceed the frequency of the pulse train provided by the oscillator 42. Accordingly, the buffer register will begin to count in the reverse direction. When the state of the output stage of the buffer register is reversed the number of pulses from the vector approximator will have equaled the number from the oscillator and the signals on lines 36 and 38 will be terminated. This circuitry operates to insure that the motion of the controlled member 10 will proceed at the rate commanded by the feed rate number.

The novelty of the circuitry heretofore described lies in the provision of the vector approximator, reversible buffer register and voltage controlled oscillator, and their cooperation with the balance of the circuitry to achieve the resultant motion rate in accordance with the feed rate command. With the exception of the novel elements, systems of the above type are well known to the art and are disclosed in U.S. Pat. No. 3,128,374 to Ho et al.

FIG. 2 illustrates the arrangement of that part of the circuitry which regulates the operation of the interpolator to achieve the commanded feed rate. The command pulse trains on lines 24 and 26 are first provided to a magnitude determination unit 50 which compares the frequencies of the two trains to identify the larger of the two. Depending upon which of the signals is the largest an appropriate output signal is provided on one of two lines 52 to a switch unit 54. The switch unit also has the two command pulse trains as its input and it acts to provide the larger of the two, as identified by the magnitude determination unit 50, as an output on line 56. The smaller of the two pulse trains is similarly provided as a switch output on line 58.

The higher frequency feed rate signal is provided to a generator 60 which effectively deletes every sixteenth pulse from the train and provides the remaining fifteen as an output on line 62. The smaller feed rate signal, on line 58, is provided to a generator 64 which provides every other pulse as an output on line 66. The pulse train is passed through a delay unit 68 and then is summed with the output of the generator 60 at a sum point 70. The delay unit 68 insures that the pulse on line 66 and one on 62 will not reach the sum point 70 simultaneously.

The output of the sum point 70 therefore constitutes a pulse train having a rate proportional to $15/16 A + 1/2 B$ where A is the pulse train of the higher frequency and B is the pulse train of the lower frequency. It can readily be shown that the distance represented by the number of pulses in this train approximates within 6% the distance through which the output member will be moved. Also, the instantaneous frequency of the output of the sum point 70 approximates the instantaneous rate of motion of the output member.

The output of the sum point is provided on line 46 to a synchronizer 72 contained within the reversible buffer register 40. The synchronizer also receives the output pulse train of the voltage controlled oscillator 42. It insures that the pulses on line 46 are provided to the reversible counter 74 itself in a non-simultaneous manner with the pulses from the VCO 42.

The use of NAND gates allows combinations of a single logical element to perform the functions of all possible arrangements of AND gates, OR gates and inverters. The symbols used in the following schematic drawings are illustrated in FIGS. 3A–3D. The identical electronics element are used to implement each of the configurations shown in FIGS. 3A–3D, but the symbols are differentiated from one another to make the function which a particular gate performs more readily apparent on examination of the drawing. Such use of NAND gate symbols has become standard in the industry.

All of the NAND gates provide an output which is opposite in sign to that of both of their inputs at such time as both (or all) of their inputs are of the same sign, and provide an output of the same sign as the energized inputs, when less than all of the inputs are energized. The truth table for the elements is therefore as follows where A and B are inputs and C is the output:

TRUTH TABLE

| A | B | C |
|---|---|---|
| 0 | 0 | 1 |
| 0 | 1 | 1 |
| 1 | 1 | 0 |
| 1 | 0 | 1 |

Accordingly, the devices have the same logical configuration as an AND gate followed by an inverter. They may also be used as inverters by always leaving one of the inputs unenergized.

The elements are all drawn as rectangles having curved righthand (output) edges. When they are used as OR gates the left-hand (input) edge is curved parallel to the output end. When they are used as AND gates the left-hand edge is a straight line. Small circles are either placed on all the inputs or the outputs of a gate to signify the direction of change of state of the input which will energize the output. In accordance with this symbolism FIG. 3A illustrates a NAND gate used in the manner of an OR gate which will provide a true output when both of its inputs are prime. FIG. 3B shows a NAND gate used in the manner of an OR gate which will provide a prime output when both of its inputs are true. FIG. 3C illustrates a NAND gate used in the manner of an AND gate which will provide a true output when one of its inputs are prime. FIG. D illustrates a NAND gate used in the manner of an AND gate which will provide a prime output when both of its inputs are true. Again, all these units are physically identical with one another but the symbols are differentiated to simplify the reading of the diagrams. It should be recognized that the subsequent logic could also be implemented by AND and OR gates or other electronic techniques.

The internal logic of the magnitude determination unit 50 is disclosed in FIG. 4. The pulses on line 24 representing the overflows from the X command interpolator 20 are provided as one input to a gate 80, while the pulses on line 26, representing the overflows from the Y command interpolator 22 are provided as one input to a gate 82. The two pulse lines 24 and 26 are also provided as the two inputs to a gate 84. Assuming that a pulse appears on only one line at a single time the output of the gate 84 will be prime. This output is provided as a second conditioning input to the gates 80 and 82. With only a pulse occurring on one of the lines, only a single true input will be provided to the gate 80 or 82 associated with that line and the output of that gate will be true while the output of the other gate is prime. The outputs of the two gates 80 and 82 feed two gates 86 and 88 respectively which have no connection to their second inputs so that they act to invert their input signals. Accordingly, a true output will be provided by that gate 86 or 88 which is energized by a prime input from the gate 80 or 82. If a pulse appears on line 24 and no simultaneous pulse appears on line 26 a prime ouput will be provided by the gate 80 and a true output will be provided by the gate 86. This gate connects to the set input of a flip-flop 90, while the output of the gate 88 connects to the reset input of that flip-flop.

Thus, a pulse on line 24 will set the flip-flop 90 and a pulse on line 26 will reset the flip-flop 90 and no input will be provided to the flip-flop when simultaneous pulses are received on lines 24 and 26.

The set output of the flip-flop 90 provides one input to a gate 92 and the output of the gate 86 provides the other input to the gate 92. Similarly the reset output of the flip-flop 90 is provided as an input to a gate 94 while the output of the gate 88 constitutes the other input to gate 94. Both inputs to gate 92 will be energized if the flip-flop 90 is in its set condition, as a result of having last received a pulse on line 24, and another pulse occurs on that line before occurrence of a pulse on line 26. The gate 92 will then provide a prime output to a gate 96 which has its other input unconnected. Accordingly, it will invert the output of the gate 92 and energize the set input of a flip-flop 98.

Similarly, if the flip-flop 90 has been reset by a pulse on line 26 and another pulse is provided on that line before the occurrence of a pulse on line 24 a prime output will be provided by the gate 94 to a gate 100, which will provide an inverted signal to the reset input of the flip-flop 98.

The test of the occurrence of two consecutive pulses on one of the lines without the intervention of a pulse on the other line is used to determine which of the two pulse trains is larger. Thus, a set output will be provided by the flip-flop 98 if the pulse train on line 24 is the largest, and a reset output will be provided if the pulse train on line 26 is the largest. If the pulse trains are equal the flip-flop 98 will change state at intervals.

Both the set and the reset outputs of the flip-flop 98 are provided to the switch 54 which is shown in logical detail in FIG. 5. The set output of the flip-flop 98 (indicating that the pulse train on line 24 is the larger of the two) and the pulse train on line 24 are provided to a gate 102. The reset output of flip-flop 98 as well as the pulse train on line 26 are provided as inputs to a gate 104. The two outputs of the gate 102 and 104 are provided to a gate 106 which has the line 56 as its output. Accordingly, if the flip-flop 98 is set the pulse train on line 24 will be directed out on the line 56. If the flip-flop 98 is reset the pulse train on line 26 will be provided out of line 56.

Similarly, the reset output of flip-flop 98 and the pulse train of line 24 are provided to a gate 108 while the set output on line 26 is provided to a gate 110. These two gates provide the two inputs to the gate 112. If the flip-flop 98 is reset (indicating that the pulse train line 24 is the smaller of the two) the train on line 24 is directed to the output on line 58. If the flip-flop 98 is set the pulse train on line 26 is provided as an output on line 58.

Line 56 is fed to a gate 114 forming the input of the 15/16 generator 60 as well as to a gate 116 which provides the output of the generator. The other input to the gate 114 is conditioned by an appropriate time signal as will be subsequently noted. In the absence of the time signal the pulse train on line 56 will be inverted by a gate 116 and provided as the input to a four bit counter 118. The outputs of the four stages of that counter are all provided to a gate 120 which, accordingly, provides an output only when all four lines are energized, which occurs once every sixteen counts. This output is provided to the gate 116 which also receives the line 56. Accordingly, once every sixteen pulses on line 56 the gate 116 acts to inhibit its output. The other fifteen pulses are provided as outputs on line 62 to a sum point 70.

The output on line 58 representing the smaller of the two command pulse trains is provided to both the set and reset inputs of a flip-flop 120 so that the flip-flop only provides output to a gate 122 on every other cycle. Line 58 provides the other input to the gate 122 so that its output occurs on every other cycle. This output is provided to an inverting gate 124 which in turn feeds a set input of a flip-flop 126. The reset input is continually provided with a positive voltage. The flip-flop is additionally conditioned by a time signal which causes it to delay its reset output by one cycle. This output is provided to the gate 128 which constitutes a sum point 70. The time signals applied to the flip-flop 126 and the gate 114 act to ensure that the pulses are applied to the sum point 70 in a non-coincident manner since the time signal only occurs during half the clock pulses. The output of the gate 128 constitutes lines 46, the output of the feed rate approximator.

The output on line 46 is fed to a synchronizer 72 within the reversible buffer register 40, as is the output of the voltage controlled oscillator 42. The synchronizer provides both of these pulse trains to the reversible counter 74. The synchronizer ensures that a pulse from the VCO 42 is not transmitted to the reversible counter 74 simultaneously with the pulse on line 46. The pulses from the VCO 42 count the reversible counter 74 in one direction while the pulses on line 46 count it in the opposite direction. The reversible counter may be of the type disclosed in Forrester et al. Pat. No. 3,069,608 as may be the synchronizer 72.

Line 36 is connected to the last stage of the reversible counter. The output of this last stage is high when the number of pulses received from the VCO 42 exceed the number of pulses received from the vector approximator on line 46. At that point a signal is provided to the interpolators which gates in clock pulses causing them to perform their addition function. When the number of pulses received from the vector approximator on line 46 exceeds the number received from the VCO 42 the output of the last stage of the reversible counter 74 is low and no add signal is sent to the interpolators.

Unit 40 thus ensures that the vector approximation signal on line 46 is equal in frequency to the output of the VCO 42 and, accordingly, that the resultant rate of motion of the controlled member 10 occurs at the rate called for by the feed rate command contained on the tape.

Having thus described my invention, I claim:

1. In an electronic system for positioning an output member along a plurality of non-coincident axes, simultaneously, under the control of numerical data stored on an input record, in combination: first data on said record to control the output member through a particular motion; second data on said record indicating the resultant rate at which said motion is to be performed, interpolators operative to accept segments of said first data and to provide a number of first output pulse trains equal to the number of axes over which control is exercised; means for receiving said first pulse trains and for generating a second pulse train having a frequency proportional to the resultant rate of motion commanded by said first pulse trains; means for receiving said second data and for generating a third pulse train having a frequency proportional to the rate of motion directed by said second data; and means for receiving said second and third pulse trains and for providing control signals to the interpolators of such nature as to maintain the frequency of said second pulse train at the same level as the frequency of the third pulse train.

2. The system of claim 1 wherein the means for accepting the second and third pulse trains provides an output signal when the number of pulses received in the third pulse train exceeds the number received in the second pulse train.

3. The system of claim 1 wherein the means for generating the second, vector approximation pulse train gates a number of pulses from each of the first pulse trains and sums them to provide its output pulse train.

4. The system of claim 1 wherein the means for receiving said second and third pulse trains and for providing control signals to the interpolators consists of a reversible counter which is counted in one direction by the pulses of said second train and in the reverse direction by the pulses of said third train.

5. The system of claim 4 wherein the control signals to the interpolators which are of such nature as to maintain the frequency of the second pulse train at the same level as the frequency of the third pulse train are determined by the state of the most significant stage of the reversible counter.

6. The system of claim 1 wherein the means for receiving said first pulse train and for generating a second pulse train having a frequency proportional to the rate of motion commanded by said first pulse train consists of means for identifying the first pulse train having the highest frequency, a summing circuit, means for gating a predetermined portion of the pulses from the first pulse train having the highest frequency to the summing means, and means for gating a different proportion of the pulses from the other of said first pulse trains to said summing means.

7. The system of claim 1 wherein control of the output member is exercised over two axes and the means for receiving said first pulse trains and for generating a second pulse train having a frequency proportional to the resultant rate of motion commanded by said first pulse trains includes means for identifying the first pulse train having the higher frequency, a summing circuit, means for gating fifteen out of each sixteen pulses from said first pulse train having the higher frequency to said summing means, and means for gating every other pulse from the other of said first pulse trains to said summing means.

8. The system of claim 1 wherein control of the output member is exercised over three axes and the means for receiving said first pulse trains and for generating a second pulse train having a frequency proportional to the resultant rate of motion commanded by said first pulse trains consists of means for identifying the relative frequency rates of said first pulse trains, a summing circuit, means for gating all of the pulses from the first pulse train having the highest frequency to said summing circuit, means for gating every second pulse from the first pulse train having the intermediate frequency to the summing circuit, and means for gating every fourth pulse from the first pulse train having the lowest frequency to the summing circuit.

9. The system of claim 1 wherein the interpolators are of the digital differential analyzer type and the control signals provided to them in order to maintain the frequency of the second pulse train at the same level as the frequency of the third pulse train consists of add command signals which are generated when the number of pulses which have occurred in the third pulse train exceeds the number of pulses which have occurred in the second pulse train.

10. In an electronic system for positioning an output member along a plurality of non-coincident axes, simultaneously, under the control of numerical data stored on an input record, which data includes first segments providing information to control the output member through a particular motion and second segments indicating the resultant rate at which said motion is to be performed, and interpolators operative to accept said first segments and to provide a number of first output pulse trains equal to the number of axes over which control is exercised, means for receiving said first pulse trains and for generating a second, vector approximation pulse train having a frequency proportional to the resultant rate of motion commanded by said first pulse trains, the last said means consisting of means for identifying the relative frequencies of said first pulse trains, summing means, and means for gating a particular proportion of pulses from each of said first pulse trains to the summing means, the proportion derived from each of the said first pulse trains being dependent upon its frequency relative to the frequencies of the other first pulse trains.

11. The system of claim 10 wherein control is exercised over the output member through two axes and the means for gating a particular proportion of pulses from each of said trains derives fifteen out of sixteen pulses from the first pulse train having the higher frequency and one-half of pulses from the first pulse train having the lower frequency.

12. The system of claim 10 wherein control of the output member is exercised over three axes and the means for gating a particular proportion of pulses from each of said first pulse trains to the summing means gates all of the pulses from the first pulse train having the highest frequency, one-half of the pulses from the pulse train having the intermediate frequency, and one-quarter of the pulses from the pulse train having the lowest frequency.

13. In an electronic system for positioning an output member along a plurality of non-coincident axes, simultaneously, under the control of numerical data stored on an input record, in combination: first data on said record to control the output member through a particular motion, second data on said record indicating the resultant rate at which said motion is to be performed; interpolators operative to accept segments of said first data and to provide a number of first output signals equal to the number of axes over which control is exercised; means for receiving said first signals and for generating a second signal having a property proportional to the resultant rate of motion commanded by said first signals; means for receiving said second data and for generating a third signal having a property proportional to the rate of motion directed by said second data; and means for receiving said second and third signals and for providing control signals to the interpolators of such nature as to maintain the said property of said second signal at the same level as the said property of the third signal.

References Cited

UNITED STATES PATENTS

| | | |
|---|---|---|
| 3,066,868 | 12/1962 | Tripp. |
| 3,122,691 | 2/1964 | Centner et al. |
| 3,297,924 | 1/1967 | Kamm. |
| 3,428,876 | 2/1969 | Kelling. |

EUGENE G. BOTZ, Primary Examiner

J. F. RUGGIERO, Assistant Examiner

U.S. Cl. X.R.

235—151.11; 318—18